United States Patent [19]

Turner et al.

[11] Patent Number: 5,332,244
[45] Date of Patent: Jul. 26, 1994

[54] BICYCLE WITH SELECTABLY ENGAGEABLE SINGLE OR DUAL WHEEL DRIVE

[75] Inventors: Patrick E. Turner; Lawrence K. O'Dell, both of Rogers, Ark.

[73] Assignee: Turner Drive Systems, Inc., Rogers, Ark.

[21] Appl. No.: 956,915

[22] Filed: Oct. 5, 1992

[51] Int. Cl.⁵ .......................................... B62M 17/00
[52] U.S. Cl. .................................. 280/230; 280/212; 280/259; 180/224
[58] Field of Search ............... 280/200, 230, 212, 214, 280/239, 259, 260, 261; 180/224

[56] References Cited

U.S. PATENT DOCUMENTS

| 559,934 | 5/1896 | Cunningham | 280/261 |
|---|---|---|---|
| 4,029,332 | 6/1977 | Davis | 280/234 |
| 4,397,369 | 8/1983 | Read | 180/224 |
| 4,479,660 | 10/1984 | Pattison | 280/261 |
| 4,895,385 | 1/1990 | Becoat | 280/259 |
| 5,004,258 | 4/1991 | Becoat | 280/259 |
| 5,052,705 | 10/1991 | Ringle | 280/212 |
| 5,116,070 | 5/1992 | Becoat | 280/259 |
| 5,158,314 | 10/1992 | Farras Pinos | 280/259 |
| 5,184,838 | 2/1993 | Becoat | 280/259 |
| 5,224,725 | 7/1993 | Erlston | 280/259 |
| 5,253,889 | 10/1993 | Kaminski | 280/230 |

FOREIGN PATENT DOCUMENTS

| 2081 | of 1902 | United Kingdom | 280/212 |
|---|---|---|---|
| 9112167 | 8/1991 | World Int. Prop. O. | 280/230 |
| 9215478 | 9/1992 | World Int. Prop. O. | 280/230 |

Primary Examiner—Margaret A. Focarino
Assistant Examiner—Kevin Hurley
Attorney, Agent, or Firm—Boyd D. Cox

[57] ABSTRACT

A drive mechanism is disclosed that is selectably engageable to provide a bicycle that has normally driven and nondriven wheels with either single or dual wheel drive. The drive mechanism includes a power take off means that has: a first power transmission mechanism mounted on said frame; a second power transmission mechanism mounted on the bicycle frame in positive drive power transmitting engagement with a normally non-driven wheel of the bicycle; and a power transfer apparatus connected to receive power from the first power transmission mechanism and transmit it to the second power transmission mechanism. A coupling mechanism is operatively connected with the power take off and is selectively actuatable to place the first power transmission mechanism either in a drive position receiving power from the normally driven wheel or a disengaged non-power transmitting position. An actuator mechanism is mounted on the bicycle to selectively move the coupling mechanism either to the disengaged position or to the drive position to energize the power transfer apparatus and drive the normally non-driven wheel.

17 Claims, 4 Drawing Sheets

BICYCLE WITH SELECTABLY ENGAGEABLE SINGLE OR DUAL WHEEL DRIVE

FIELD OF THE INVENTION

The present invention relates to bicycle drive mechanisms and more particularly to a kit for converting a single wheel drive bicycle to a selectably engageable single or dual wheel drive, as well as to a bicycle having such a selectively engageable single or dual wheel drive mechanism.

BACKGROUND OF THE INVENTION

A conventional bicycle includes a frame having a normally non-driven front wheel and a rear driven wheel rotatably mounted thereon. The rear wheel conventionally has a driven element thereon which may comprise a rear chain driven sprocket cluster having several different size gears and a rear derailleur mechanism. A pedal driven crankset, that includes a pedal sprocket or sprockets, is mounted on the frame and serves as a prime mover for the drive wheel. A drive chain is trained around one of the pedal sprockets and one of the sprockets of the rear sprocket cluster. The rear derailleur mechanism is manually operable to shift the drive chain to train it about any desired one of the sprockets of the rear sprocket cluster. If the crank set includes two or three pedal sprockets, a front derailleur mechanism is also mounted to shift the chain to train it about any desired one of the pedal gears. Such shifting of the drive chain allows the operator to select an optimum sprocket ratio for driving the bicycle over the terrain on which it is being ridden. These sprocket ratios are commonly referred to as "speeds". A rear wheel drive bicycle may have rear wheel and pedal sprocket clusters that provide a large number of speeds with 10, 18 and 21 speed bicycles being in widespread use. The frame also includes a seat for supporting the bicycle rider and a front steerably mounted fork on which the front wheel is rotatably mounted. Handle bars are connected to the front steerable fork for steering the bicycle in known manner. The rear and front derailleurs each have controls mounted on the frame in a position to be conveniently reached by the operator to shift speeds while pedaling the bicycle.

Bicycles are increasingly being ridden off of paved roads and on rough terrain, which is steep, unpaved, frequently wet or muddy and covered by vegetation in places. Off road trails are particularly prone to have treacherously slippery sections caused by mud or uncut vegetation such as grass and weeds. Because of the rough and slippery terrain bikes are driven over, increased traction is desired. To achieve such traction, it is known to provide a multi-speed bicycle with a drive mechanism that allows for simultaneous and constant driving of both the front and rear wheels. This type of drive mechanism will be referred to as a constant dual wheel drive.

U.S. Pat. No. 559,934, issued May 12, 1896, to C. L. Cunningham; U.S. Pat. No. 4,029,332, issued Jun. 14, 1977, to Harry C. Davis; U.S. Pat. No. 4,479,660, issued Oct. 30, 1984, to Daniel J. Pattirson U.S. Pat. No. 4,895,385, issued Jan. 23, 1990, to Billie J. Becoat and U.S. Pat. No. 5,004,258, also issued to Billie J. Becoat, on Apr. 2, 1991, show various types of constant dual wheel drive mechanisms for always driving both of the wheels of a bicycle. These prior art constants dual wheel drive mechanism constantly drive both wheels and the bicycle rider is not able to selectively shift the bicycle between single or dual wheel drive operation. It is not advantageous to always constantly drive both wheels, and the inability to disengage the drive to one of the bicycle wheels reduces the efficiency of the bicycle drive under some operating conditions. For example, on flat terrain, it would be desirable to disengage the front wheel drive to eliminate frictional losses in the drive train which leads to the front wheel. However, with prior art designs this can not be done.

U.S. Pat. No. 5,052,705, issued on Oct. 1, 1991, to Thomas J. Ringle, discloses a selective single or dual wheel drive bicycle, which provides caliper actuated rear and front wheel idlers that are interconnected by a rotatable, flexible cable. By engaging both of the front and rear wheel calipers, drive power can be selectively transferred by the rider from the rear to the front wheel to provide dual wheel drive for the bicycle. This dual wheel drive relies on frictional engagement of each idler with its associated wheel rim. A friction drive is very inefficient and unreliable in wet conditions. Water, mud and tall succulent vegetation, which passes between the rim and the idler, all function as lubricants which will cause the idlers to slip relative to the rim. Such slippage makes it virtually impossible for an idler roller to efficiently receive drive power from the rear wheel rim by friction contact, and transfer such power to the front rim through the front frictionally engaged idler. Thus, friction drive mechanisms for transmitting drive power to the normally non-driven wheel becomes the least effective at the very time when dual wheel drive power is most needed; that is under wet slippery hilly conditions that tend to make the bicycle unstable and dangerous to ride.

Therefore, even though there has been almost 100 years of bicycle drive mechanism development following the issuance of U.S. Pat. No. 559,934, previously mentioned, a need still exists for a bicycle drive mechanism that will provide a selectively engageable positive transmission of drive power to either one or both wheels of the bicycle to avoid the long and well recognized short comings of prior art drive mechanisms.

SUMMARY OF THE INVENTION

The present invention provides a kit for converting an existing bicycle from a single wheel drive to a selectable single or dual wheel positive drive mechanism, or provides a bicycle that is originally manufactured to include such a selectable single or dual wheel positive drive mechanism.

The invention comprises a power take off mechanism that is connectable for positive transmission of drive power from a driven element that rotates in response to rotation of the rear wheel of the bicycle. A coupling device is operatively connected with the power take off mechanism and is selectably actuatable to place the power take off means in either a drive position that connects the driven element in positive drive power transmitting relation with the normally non-driven front wheel or in a disengaged position wherein driving power is not transmitted to the front wheel. An actuator mechanism is provided to move the coupling mechanism to either the drive position or the disengaged position.

According to a first embodiment of the invention, the kit includes a first power transmitting means that is mountable on the frame of the bicycle to be selectively moved into an inter-locked position which places it in positive power transmitting engagement with a driven element, such as a sprocket, on the rear drive wheel of the bicycle or to a remote disengaged non-power transmitting position relative to the driven element. A second power transmitting means is mountable on the bicycle frame in positive power transmitting engagement with the normally non-driven wheel, such as the front wheel of the bicycle. A power transfer means, such as a flexible rotary cable, has a power input end mountable to receive power from the first power transmitting means and a power output end mounted to impart such power to the second power transmitting means. An actuator means is provided that can be controlled by the bike rider to move the first power transmitting means to either the inner-locked positive drive position or the remote disengaged position.

Preferably, the first power transmitting means of the first embodiment will include a support means such as a swing arm and spaced apart drive and idler sprockets that are mounted on the swing arm. The swing arm is in turn pivotally mountable on the bicycle frame. A first endless chain is trained about the drive and idler sprockets and the drive sprocket in turn is connected in driving relation with one end of the power transfer rotary cable. The second power transfer means preferably includes a freewheel drive front sprocket mounted on the normally non-driven front wheel, a transmission sprocket mounted in spaced relation to the freewheel drive front sprocket, that is connected to the other end of the power transfer rotary cable, and a second endless chain trained about the freewheel drive front sprocket and the transmission sprocket. The actuating means is a hand actuated control preferably mounted on the frame for convenient access by the rider to move the swing arm about its pivot mounting on the frame which serves as a coupling mechanism to place the first chain in the interlocked position in positive drive engagement with one of the sprockets on the rear wheel sprocket cluster, or to the disengaged position where the first chain is in a remote disengaged position relative to the rear sprocket cluster.

According to a second embodiment of the invention the kit includes a first power transmission means mountable on the frame of the bicycle that has a drive sprocket and a first endless chain trained about the driven element and the drive sprocket so that rotation of the rear wheel will rotate the drive sprocket. A second power transmitting means is mountable on the bicycle frame in positive drive power transmitting engagement with the normally non-driven front wheel. A power transfer mean is provided having power input and power output ends. The power output end is connected to the second power transmission means. The power input end is selectably connectable in positive drive power receiving relation selection with the drive sprocket by a coupling device.

Preferably the coupling means includes a first coupling element fixedly mounted on the power input end of the flexible drive shaft for rotation therewith; a second coupling element is rotatably mounted on the power input end of the flexible drive shaft for rotation by the drive sprocket; and an engagement means in the form of a pin moveable to either an interlocked position in positive drive power transmitting relation between the first and second coupling elements to rotate the flexible drive shaft, or to a disengaged non-driving position. An actuator means is provided to move the engagement means to either the interlocked or disengaged positions.

BRIEF DESCRIPTION OF THE DRAWINGS

Referring to the drawings.

BRIEF DESCRIPTION OF THE PREFERRED EMBODIMENTS

Figure 1:
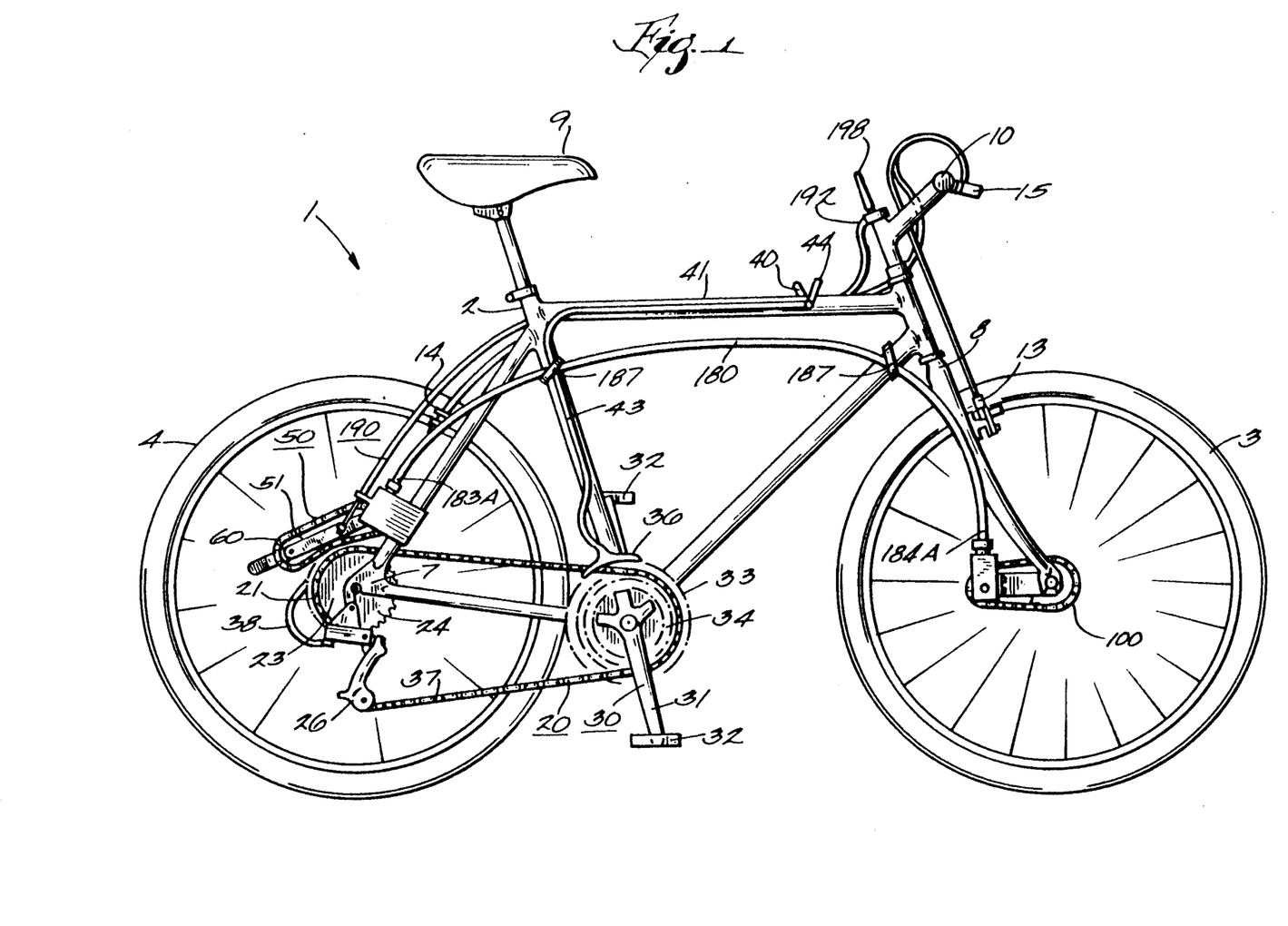
FIG. 1 is a side elevational view of a bicycle incorporating a first embodiment of a selectably engageable single or dual wheel drive mechanism.

FIG. 1 of the drawings shows a conventional bicycle 1 including a frame 2 having a normally non-driven front wheel 3 and a rear drive wheel 4 rotatably mounted thereon. The rear wheel 4 is mounted on a rear portion 7 of frame 2 and the front wheel 3 is mounted on a front fork 8 steerably mounted on frame 2. The bicycle frame 2 also includes a seat 9 for supporting the bicycle rider and handle bars 10 connected to the front steerable fork 8 to allow the rider to steer the bicycle in known manner. The bicycle 1 also includes conventional caliper type brakes 13, 14 for the front and rear wheels 3 and 4 which are operated in conventional manner by brake lever means 15 mounted on the handle bar 10 of the bicycle 1.

The rear drive wheel 4 is rotated by a conventional rear wheel drive mechanism 20 which will now be described. Rear drive wheel 4 has a driven element 21 which comprises a chain driven rear freewheel sprocket cluster 23 having a plurality of individual sprockets 24 of different sizes. As shown the sprocket cluster 23 has five different size sprockets but a greater or lesser number of sprockets 24 could be provided. A rear derailleur 26 is mounted on the rear frame portion 7 adjacent the rear wheel gear cluster 23 and the function thereof will be explained hereinafter. A prime mover 30 is provided for manually rotating the rear wheel 4 and includes a pedal driven crankset 31 that is rotatably mounted on the bicycle frame. The crankset 31 includes a pair of pedals 32, a pedal sprocket cluster 33 comprising three different size individual sprockets 34 and a pedal sprocket derailleur mechanism 36 mounted on frame 2 adjacent pedal sprocket cluster 33. A drive chain 37 is trained around one of the pedal sprockets 34 and one of the sprockets 24 of the rear gear cluster 23. The rear derailleur mechanism 26 is manually operable by the rider to shift the drive chain 37 to train it about any desired one of the sprockets 24 of the rear sprocket cluster 23. The shifting of the rear derailleur mechanism 26 is controlled by a reciprocating cable mechanism 38, actuated by rear derailleur control lever 40, mounted on the top tube 41 of the bicycle frame 2. The pedal gear derailleur mechanism 36 is operated by a reciprocating cable 43 mechanism actuated by a pedal sprocket derailleur control lever 44 also mounted on the top tube 41 of frame 2. Shifting of the drive chain 37, by the derailleur mechanisms 26 and 36, allows the bicycle rider to select an optimum speed for the bicycle.

The bicycle thus far described is conventional. As previously mentioned, the front wheel 3 is non-driven and only the rear wheel is rotated by the rear wheel drive mechanism 20 to drive the bicycle at any one of a plurality of speeds as determined by the gear ratios selected by the bicycle rider.

The present invention provides two embodiments of a drive mechanism for converting the conventional bicycle 1, that has just been described, from a single rear wheel drive to a selectable single or dual wheel positive drive bicycle. The invention may be embodied in a kit that can be used to convert any conventional multispeed bicycle from a single wheel drive to a single or dual wheel drive mechanism, or the invention may be embodied in a bicycle at the time of its original manufacture.

FIRST EMBODIMENT

Figures 2, 4:
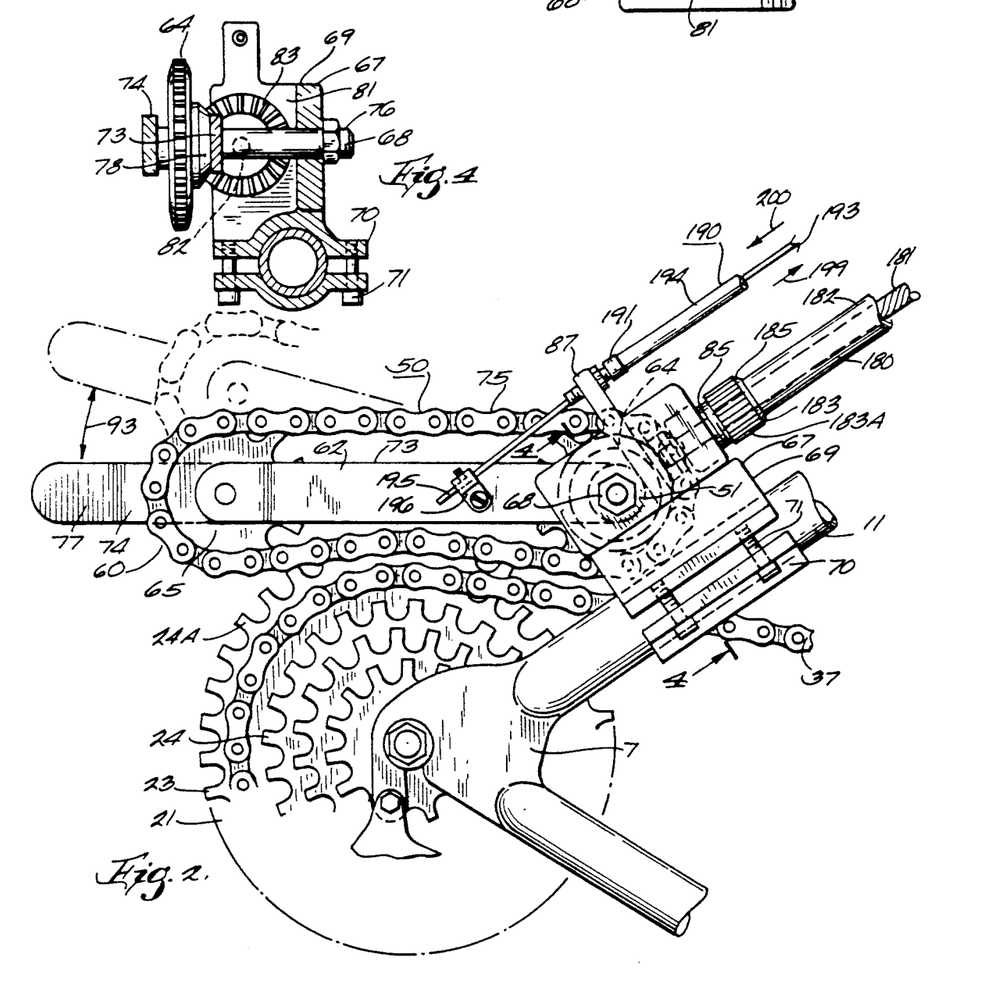
FIG. 2 is an enlarged partial side elevational view of a portion of the rear wheel of the bicycle shown in FIG. 1.
FIG. 4 is a sectional view taken along line 4—4 of FIG. 2.
Figure 5:
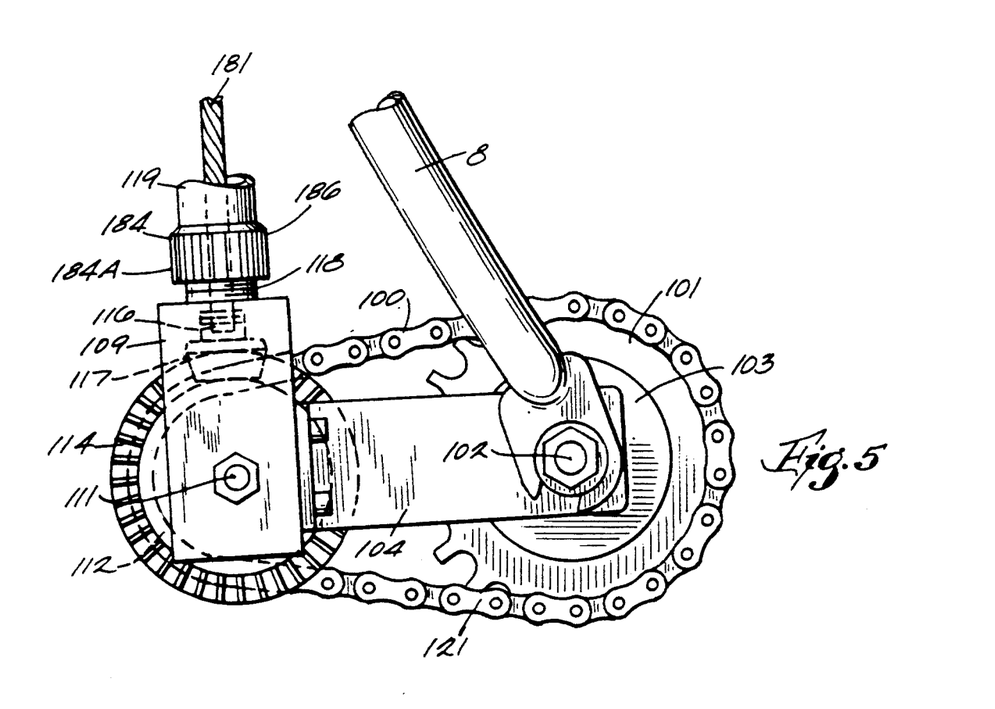
FIG. 5 is an enlarged partial side elevational view of a portion of the front wheel of the bicycle shown in FIG. 1.

FIGS. 1 through 6 show a first embodiment of the invention. Referring particularly to FIGS. 1, 2 and 5, the kit for converting the bicycle from a single rear wheel drive mechanism 20 to a selectable single or dual wheel positive drive mechanism generally comprises: a power take-off means 50 for positive transmission of power from the rear wheel driven element 21 to the normally non-driven front wheel 3; a coupling means 51 selectably actuatable to place the power take off means 50 in a drive position shown in FIG. 2 connecting the driven element 21 in positive drive power transmitting relation with the normally non-driven front wheel 3 or to a disengaged position shown in dot-dash lines in FIG. 2; and an actuator means 190 for moving the power take-off means to either the interlocked or the disengaged positions. More specifically, the power take-off means 50 of the first embodiment comprises: a first power transmission means 60 mountable on the bicycle frame 2 for selectable movement into a positive power transmitting engagement with the driven element 21 on the rear drive wheel 4; a second power transmission means 100 mountable on the frame in positive power transmitting engagement with the normally non-driven front wheel 3; and a power transfer means 180 that is mountable to receive power from the first power transmitting means 60 and transmitted to the second power transmitting means 100.

The first power transmission means 60 will now be described with reference to FIGS. 2, 3 and 4. As previously explained the rear wheel sprocket cluster 23 constitutes a driven element 21 that includes five different size individual sprockets 24. The sprockets 24 of drive element 21 all rotate in response to driving rotation of the rear wheel 4 through a conventional freewheel mechanism in the rear wheel hub as is well known in the art. The driven element 21 could also be an individual sprocket separate from the sprocket cluster 23. The first power transmission means 60 includes: a support means 62; spaced apart drive and idler sprockets 64, 65 on the support means 62; a mounting means 67 in the form of a housing 69 attachable to frame 2, and a pivot means 68 for mounting the support means 62 on the mounting means housing 69. The mounting means 67 also includes a bracket assembly 70 detachably secured to a seatstay tube 11 of bicycle frame 2 by means of clamping bolts 71, best shown in FIG. 4.

Figure 3:
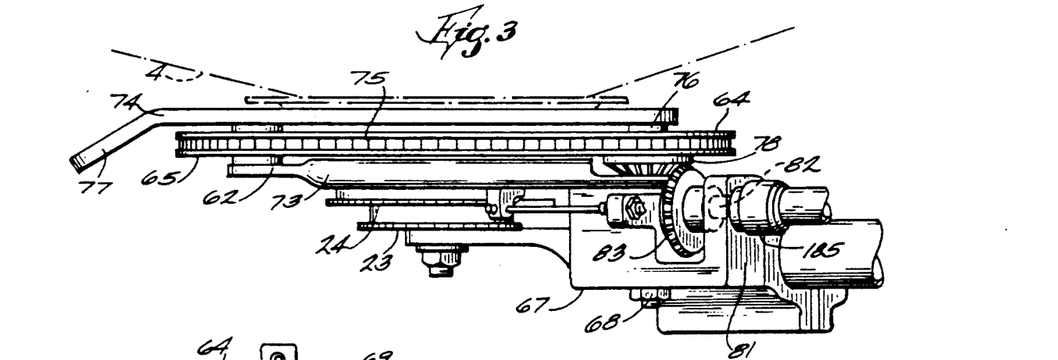
FIG. 3 is a top view of the portion of the rear wheel of the bicycle shown in FIG. 2.

As best shown in FIGS. 2, 3 and 4, the support means 62 comprises a swing arm preferably composed of a pair of spaced apart parallel swing arms 73, 74. Arm 74 includes a guard extension 77. The drive and idler sprockets 64 and 65 are rotatably mounted in spaced apart relation between swing arms 73, 74. A first endless chain 75 is trained about the drive and idler sprockets 64, 65. Preferably, the pivot means 68 comprises a shaft 76 carried by mounting means 67 that rotatably supports both of the swing arms 73 and 74, and the driving sprocket 64. The driving sprocket 64 has a rear ring gear 78 fixed thereto. The swing arms 73, 74 of the support means 62 are mounted on the bicycle frame 2 in a position to place the first endless chain 75 in vertically aligned relation with the inner most sprocket 24A of the rear wheel sprocket cluster 23.

The pivot shaft 76 and the rotatable mounting of support arms 73, 74 constitutes the selectably actuatable coupling means 51. The pivot mounting of the swing arms 73, 74 allow first endless chain 75 mounted thereon to be lowered into interlocked engagement with sprocket 24A or raised to a disengaged position. This raising and lowering is effected by the actuator means 190 which will be further explained hereinafter.

The mounting means housing 69 includes an inwardly projecting portion 81 (FIGS. 3 and 4) in which a pinion gear shaft 82 is rotatably mounted. A pinion gear 83 is secured to shaft 82 in mesh with ring gear 78. The mounting portion 81 also includes a rear externally threaded mounting stud portion 85 coaxial with shaft 82 which is adapted to releasably connect the power transfer means 180 to pinion gear 83, as will be described further hereinafter. The mounting means housing 69 also has an upstanding flange member 87 on which an end portion 191 of the actuator means 190 is connected.

Figure 6:
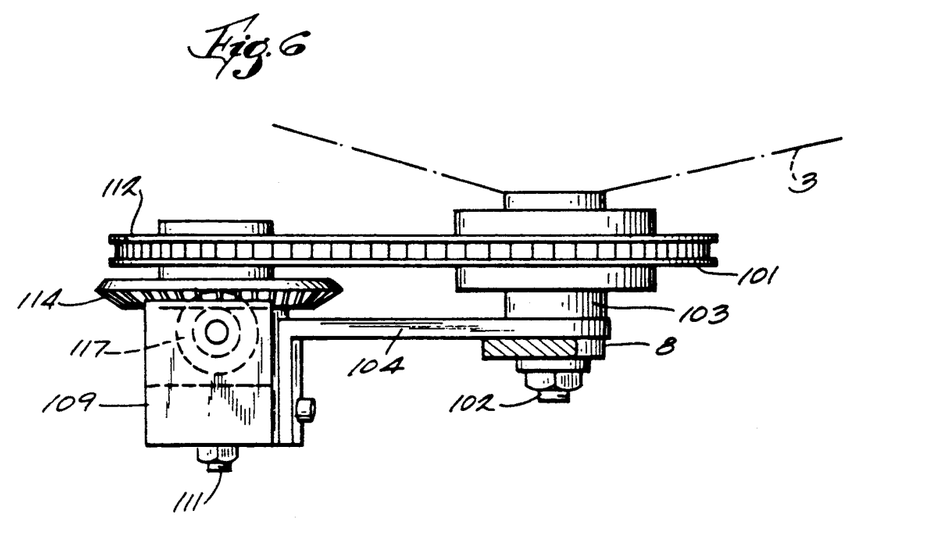
FIG. 6 is a top view of the top portion of the front wheel of the bicycle shown in FIG. 5.

The second power transmission means 100 will now be described with reference to FIGS. 5 and 6. The second power transmission means 100 includes a freewheel drive front driven sprocket or element 101 that is mounted on a conventional free wheel drive mechanism 103 threaded on the axle 102 of normally non-driven front wheel 3. A front wheel support bracket 104 is threaded or brazed to axle 102 and clamped between the bicycle front fork 8 and the hub of the free wheel drive mechanism 103 on which the front sprocket 101 is mounted. A housing 109 is mounted on the front wheel support bracket 104. A shaft 111 is mounted in housing 109 and a driving sprocket or element 112 is rotatably mounted on shaft 111 and driven by the power transmission means 180. A second ring gear 114 is also mounted on shaft 111 and interconnected with the sprocket 112 so as to rotate therewith.

The housing 109 further includes a pinion gear shaft 116 rotatably mounted thereon and a pinion gear 117 in meshed relationship with the second ring gear 114. A front externally threaded mounting stud portion 118 is also carried by the housing 109 of front wheel support bracket 104 for detachably mounting a front end portion 119 of the power transfer means 180 in a manner to be described hereinafter. A second endless power transmitting element or chain 121 is trained about the freewheel drive front sprocket 101 and the transmission sprocket 112 and serves to drive the normally non-driven front wheel 3 when the power transfer means 180 is energized.

The power transfer means 180 will now be described with reference to FIG. 1, 3 and 5. The power transfer means 180 is interconnected between the first power transmission means 60 and the second power transmission means 100. The power transfer means 180 comprises an inner cable 181 rotatable within a flexible outer sheath 182 that has rear and front detachable connections 183, 184 that connect the power input and output ends 183a, 184a thereof to the first and second power transmission means 60 and 100. The detachable connections 183, 184 include knurled nuts 185 and 186 threadable onto stud portions 85 and 118. The rear power input end and the front power output end of the inner rotatable cable 181 are detachably mounted in sockets (not shown) in the front and rear pinion gears 117 and 83. The outer sheath 182 may be secured to frame 2 by detachable strap or clip members 187. Rotation of the rear pinion gear 83 will cause rotation of the inner cable 181 which results in corresponding rotation of the front pinion gear 117.

The actuator means 190 will now be described with reference to FIGS. 1 and 2. Actuator means 190 comprises an outer sheath 194 and a slide wire or flexible cable 193 reciprocally mounted for reciprocation within sheath 194. The rear end 191 of the sheath 194 is secured to the flange 87 of the mounting means 67. The front end 192 of the sheath 194 is secured on the handle bars 10 of the bicycle. The slide wire 193, mounted within the sheath 194, has its rear most end 195 clamped to the swing arm 73 by a clamp means 196, best shown in FIG. 2. The front end of the slide wire 193 is connected to an actuator lever 198 (FIG. 1). Movement of the actuating lever 197 will reciprocate slide wire 193 and raise and lower the swing arm of support means 62 in the directions of arrow 93 in FIG. 2.

The operation of the first embodiment of the selectable single or dual wheel drive mechanism will now be described with reference to FIGS. 1 through 6. When the bicycle rider desires to drive only the rear wheel of the bicycle, the actuating lever 198 is moved in the direction of arrow 199 in FIG. 2 to retract slide wire 193, and raise the swing arms 73, 74 of support means 62 to place the first endless chain 75 in a remote disengaged non-driving position relative to sprocket 24A, as shown by the dot dash lines in FIG. 2. When the rider wants to shift into dual rear and front wheel drive, the actuating lever 198 is moved to impel slide wire 193 in the direction of arrow 200 to cause the swing arms 73, 74 of support means 62 to be placed in the solid line position, shown in FIG. 2, wherein the first endless chain 75 is engaged with the inner most sprocket 24A of the rear sprocket cluster 23. The first endless chain 75 is now in an interlocked position in positive power transmitting engagement with the sprocket 24A which rotates with rear drive wheel 4.

Rotation of the sprocket 24A will drive the first endless chain 75 and rotate its associated drive sprocket 64. Rotation of drive sprocket 64 will cause a rotation of the rear ring and pinion gears 78, 83 and the flexible cable 181 of the power transfer means 180. Rotation of the flexible cable 181 in turn causes rotation of the front ring and pinion gears 114, 117 which drives transmission gear 106. Driving transmission gear 106 causes the second endless chain 121 to rotate the front freewheel drive front gear 101 and provide positive drive to the front wheel of the bicycle. Drive power will be transmitted to front wheel 3 as long as swing arm 62 remains in a position placing the first endless chain 75 in the positive interlocked drive position relative to sprocket 24A of the rear wheel sprocket cluster. With chain 75 in this interlocked position, both front and rear wheels 3 and 4 of the bicycle are positively driven when the bicycle rider rotates the crankset pedals 32. Whenever the rider stops rotating the crankset pedals 32, the freewheel mechanisms on the rear and front wheels respectively will allow the bicycle to coast in a normal manner. Whenever the bike rider decides that front wheel drive is not desired, the lever 198 of the actuating means 190 can be moved to raise the swing arms 73, 74 to the disengaged position shown by the dot-dash lines in FIG. 2, which withdraws the first endless chain 75 from engagement with sprocket 24A.

A kit including the first and second power transmission means 60, 100; the coupling means 51; the power transfer means 180 and the actuating means 190, as above described, can be easily mounted on any conventional single wheel drive bicycle to convert it to selectable single or dual wheel drive. Also, the components of the kit could be installed at the time the bicycle is being originally manufactured to provide a bicycle having a selectable single or dual wheel drive. The use of the first and second endless chains 75, 121 and ring and pinion gears 78, 83, 114, 117 insures a positive power transmission which will be unaffected by water, mud or vegetation which could result in slippage and loss of drive efficiency in friction drive mechanisms.

SECOND EMBODIMENT

Figures 7, 8, 10:
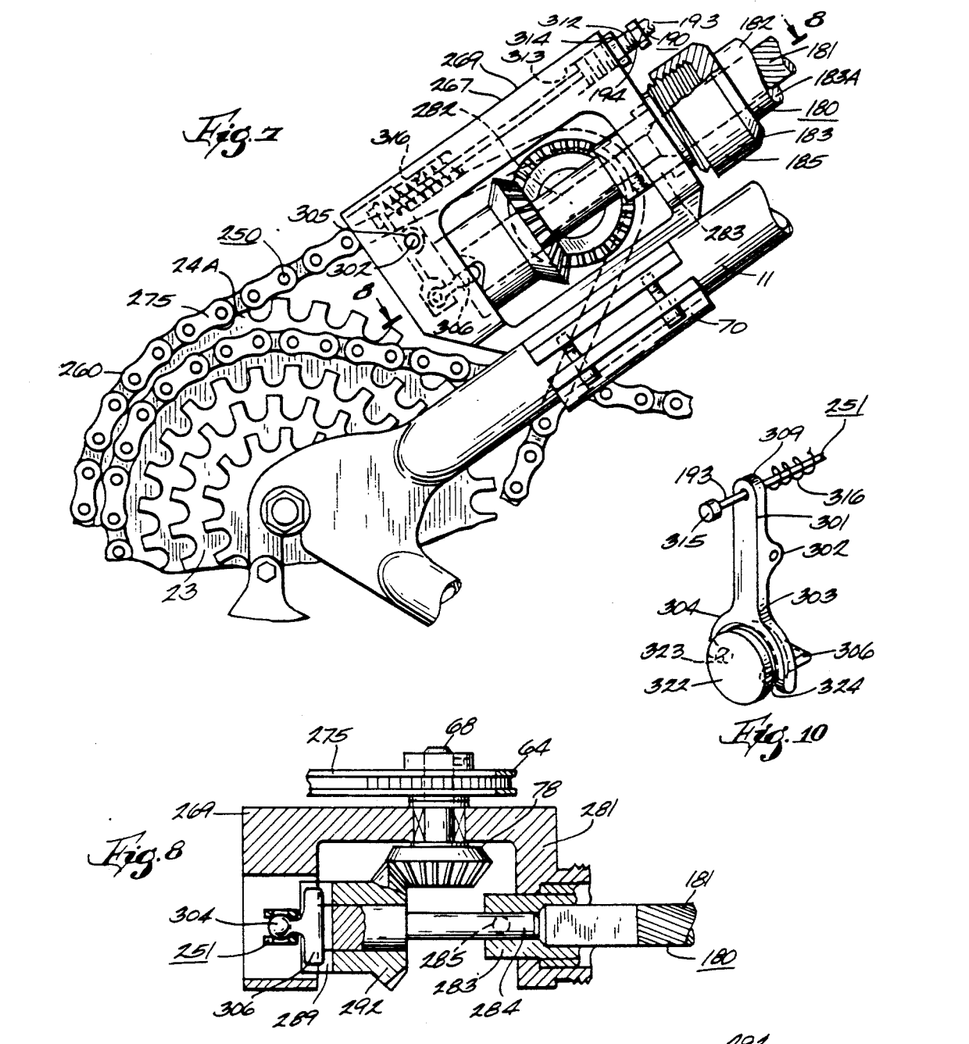
FIG. 7 is an enlarged partial side view of the bicycle shown in FIG. 1 showing a second embodiment of the selectably engageable single or dual wheel drive mechanism.
FIG. 8 is a sectional view taken along line 8—8 in FIG. 7.
FIG. 10 is a modified form of the universal joint shown in FIG. 9.
Figure 9:
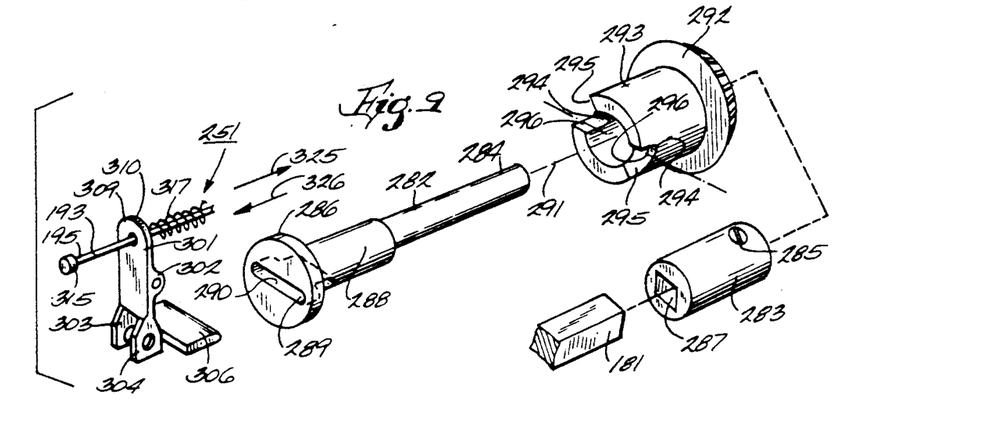
FIG. 9 is an exploded view of a coupling mechanism incorporated in the rear wheel shown in FIG. 7.

The second embodiment of the selectably engageable dual wheel drive mechanism is shown in FIGS. 7, 8 and 9. The second embodiment utilizes the same power transfer means 180, actuator means 190 and second power transmitting means 100 as used in the first embodiment and therefore these components will not be further described. As the second power transfer means 180 of the second embodiment is exactly the same as that of the first embodiment only the power input end 183A is shown in FIGS. 7, 8 and 9 it being understood that the power output end is the same as output end 184a of the first embodiment. The second embodiment also includes a coupling means 251 which will be further described hereinafter.

The second embodiment utilizes a power take off means 250 having a first power transmission means 260 that is functionally the same as the first power transmission means 60 of the first embodiment but with some minor structural differences as will now be explained. The first power transmission means 260 includes a mounting means 267 in the form of a housing 269 that is attachable to the seatstay tube 11 of bicycle frame 2 by means of the same bracket assembly 70 as previously described with respect to the first embodiment. The mounting means housing 269 also includes pivot shaft 68 on which drive sprocket 64 and rear ring gear 78 are mounted as has been previously explained with reference to the first embodiment. A first endless chain 275 is trained about sprocket 64 and sprocket 24A of the rear sprocket cluster 23.

The mounting means housing 269 includes a projecting portion 281 (FIG. 8) having an aperture in which a fitting 283, is rotatably mounted. A first coupling element which will be more fully described hereinafter includes a drive shaft 282 that has a front end 284 detachably connected to fitting 283 by set screw 285, the power input end of the flexible drive shaft 181 is square in section and is seated in a corresponding shaped socket 287 in fitting 283. The sheath 182 surrounding flexible drive shaft 181 is detachably secured to mounting means housing 267 by rear detachable connection nut 185, as has been described with reference to the first embodiment. With the connection just described it will be noted that flexible drive shaft 181, drive shaft 282 and fitting 283 rotate together as a unit.

The drive shaft or first coupling element 282 is part of the coupling means 251 which will now be described. The rear end 288 of drive shaft 282 has a radial flange 286 including a diametrically extending slot 289 therein which has slot sides 290 that extend inward parallel to the axis 291 of drive shaft 282. A second coupling element comprising flexible drive shaft pinion gear 292 is rotatably mounted on drive shaft 282 and is in mesh with ring gear 78. Pinion gear 292 includes a hub 293 that rotatably abuts radial flange 286. Hub 293 has a pair of diametrically extending second slots 294 alignable with slot 289 in drive shaft flange 286. The second slot 294 include two diametrically spaced facing cam out surfaces 295 that taper angularly with respect to the axis 291 of the drive shaft 282 and two drive surfaces 296 extending parallel to the axis 291.

The coupling means 251 also includes an coupling lever 301 pivotably mounted at its midpoint on a fulcrum 302 carried by the mounting means housing 67 for selectably interlocking the second coupling element pinion gear 292 with the radial flange 286 of the first coupling element 282 to rotate flexible drive shaft 181. The lever 301 has an inner end 303 that is bifurcated and connected to an engagement pin 306 by a universal swivel ball joint 304. The pin 306 has a diametrical width and axial length allowing it to easily slip into slots 289, 294 when they are aligned to releasably interlock flexible drive shaft flange 286 with the hub 293. The pin 306 is free to rotate 360° on the universal ball joint 304.

The lever 301 has an outer actuating end 309 remote from inner end 303. A lost motion connection 310 interconnects the actuating end 309 with the rear end 195 of slide cable 193. As previously explained with reference to the first embodiment the actuator mean 190 includes an outer sheath 194 (FIG. 7) surrounding slide cable 193. The outer sheath 194 is provided with a threaded fitting 312 that is threaded into a front internal bore 313 in the mounting means housing 267. A lock nut 314 is also threaded on fitting 312 to lock the sheath 194 in any desired position of threaded adjustment. The mounting means housing 267 also has a rear internal bore 316 opening in facing relation to the actuating end 309 of lever 301. A spring 317 is compressively mounted in bore 316 between end 309 and the inner end of bore 316 to normally bias lever 301 counter-clockwise about fulcrum 302 into slot 289. The rear end 195 of slide cable 193 passes loosely through the spring 317 and an aperture in the actuating end 309 of lever 301. A stop member 315 is attached to the end 195 of reciprocating slide cable element 193.

A modified form of the universal joint 304 is shown in FIG. 10. Instead of a ball the universal joint 304 includes a disc 322 having a circumferential slot 324 rotatably supported by trunnions 323 mounted on the bifurcated end 303. The engagement pin 306 is mounted on slotted disc 323 to project axial away therefrom for movement into slots 288 and, 294 in the same manner is described with regard to FIG. 9.

The operation of the second embodiment will now be described. The chain 275 of first power transmission means 260 rotates sprocket 64 and pinion gear 78. If no driving power is to be transmitted to the front wheel, the actuating means 190 is actuated to move slide cable 191 forward in the direction of arrow 325 (FIG. 9) to rotate lever 301 clockwise about fulcrum 302 compressing spring 316 and causing pin 306 to be withdrawn from slots 289 and 294. In this position gear 292 is allowed to rotate freely on shaft 282 without imparting any driving rotation to power transfer cable 181.

When the rider desires to drive the front wheel 3, the actuator means 190 is actuated to move slide cable 193 rearward in the direction of arrow 326 (FIG. 9). This allows the compressed spring 316 to expand, pivoting lever 301 counter-clockwise about fulcrum 302 to place engagement pin 306 in aligned slots 289, 294. The pin 306 will initially engage slot 289 and as gear 292 rotates its slots 294 will align with slot 289 and the pin 306 will then move axially into slots 289 and 294 coupling them together and thus imparting rotation to cable 181.

The cam surfaces 295 on gear 292 allows for reverse free wheeling movement of gear 292 relative to shaft 282 when the engagement pin 306 is in the aligned slots 289, 294. This reverse free wheeling action is desirable when the rider desires to reverse rotate the pedal crank set 31 to adjust the angular position of the pedals 32 prior to mounting the bicycle when the actuator means 190 is in the two wheel drive position. When reverse rotation of the crank set 31 occurs the engagement pin 306 will ride up the tapered cam surfaces 295 and out of slots 294 allowing gear 292 to rotate relative to shaft 282. When the rider starts to pedal the bicycle the gear 292 starts to rotate and when slots 294 comes into alignment with slot 289, the normal bias of spring 316 will automatically force the engagement pin back into position interlocking drive engagement in the now aligned slots 289, 294.

We claim:

1. A kit for converting a bicycle from a single wheel drive to a selectable single or dual wheel drive; said bicycle including a frame having a normally non-driven wheel and a drive wheel rotatably mounted thereon, a driven element mounted for rotation in response to driving rotation of said drive wheel, and a prime mover means connected in driving relation with said drive wheel comprising:

a power take off means connectable for positive transmission of drive power from said driven element to said normally non-driven wheel, said power take off means including a first power transmission means mountable on said frame for selective movement into either a drive position in positive power transmitting engagement with said driven element or to a disengaged position removed from engagement with said driven element, a second power transmission means mountable on said frame in positive drive power transmitting engagement with said normally non-driven wheel, and a power transfer means mountable for receiving power from said first power transmission means and for transmitting power to said second power transmission means, said power transfer means including a rotary flexible drive shaft having power input and output ends thereon;

a coupling means operatively connected with said power take off means and selectably actuatable to place said first power transmission means in either said drive position connecting said driven element in positive drive power transmitting relation with said normally non-driven wheel or in said disengaged position wherein driving power is not transmitted to said normally non-driven wheel, said coupling means including a support means mountable on said frame for movement toward and away from said driven element, spaced drive and idler sprockets rotatably mounted on said support means with said drive sprocket connected to said power input end of said rotary flexible drive shaft, and a first endless chain trained about said drive and idler sprockets; and an actuator means for selectively moving said support means either to said drive position wherein said first endless chain is placed in driven engagement with said driven element or to said disengaged position wherein said first endless chain is removed from driven engagement with said driven element.

2. The kit according to claim 1 wherein said driven element includes a rear sprocket means; said support means is mountable on said frame for movement toward and away from said rear sprocket means to enable said first endless chain that is trained about said drive and idler sprockets to be moved either to said disengaged position remote from said rear sprocket means or to said drive position wherein said first endless chain is placed in interlocked driven engagement with said rear sprocket means.

3. The kit according to claim 2 wherein said second power transmission means includes a freewheel mechanism having a front driven sprocket mounted on said normally non-driven wheel, a driving sprocket mounted in spaced relation to said freewheel front driven sprocket and connected in driven relation to said power transfer means; and a second endless chain trained about said freewheel front driven sprocket and transmission driving sprocket to drive said normally non-driven wheel when said power transfer means is energized.

4. The kit according to claim 1 wherein said support means comprises a swing arm having a pivot means for mounting said swing arm on said frame.

5. The kit according to claim 4 where said swing arm and said drive sprocket are coaxially mountable on said swing arm pivot means.

6. The kit according to claim 4 wherein:
said support means further includes a mounting means detachably securable to said frame; and
said swing arm pivot means is pivotally mountable on said mounting means for said movement toward said rear sprocket means to place said first endless chain in interlocking positive drive engagement with said rear sprocket means and for movement away from said rear sprocket means to move said first endless chain to said disengaged position.

7. The kit according to claim 6 wherein said driven element includes a multi-gear derailleur sprocket cluster and said swing arm is mountable on said frame so that when in said drive position said first endless chain is in positive interlocked driven engagement with one of the sprockets of said derailleur sprocket cluster.

8. The kit according to claim 1 wherein said power take off means comprises:

a first power transmission means mounted on said frame having a drive sprocket and a first endless chain trained about said driven element and said drive sprocket;

a second power transmission means mounted on said frame in positive drive power transmitting engagement with said normally non-driven wheel; and a power transfer means having power input and power output ends, said power output end connected to said second power transmission means and said power input end selectably connectable by said coupling means either in said drive position in positive drive power receiving relation with said drive sprocket or in said disengaged position.

9. The kit according to claim 8 wherein;
said power transfer means includes a rotary flexible drive shaft having said power input and output ends thereon;
said coupling means includes a first coupling element mounted on said power input end of said flexible drive shaft for rotation therewith, a second coupling element rotatably mounted on said power input end of said flexible drive shaft for rotation by said drive sprocket and an engagement means movable to either said drive position in interlocked positive drive power transmitting relation between said first and second coupling elements to rotate said flexible drive shaft or to said disengaged non-driven position; and
said actuator means is connected to move said engagement means to either said interlocked drive position or to said disengaged position.

10. The kit according to claim 9 wherein said first coupling element includes a first drive slot; said second coupling element includes a second drive slot alignable with said first drive slot; and said engagement means includes an engagement pin selectably insertable in said aligned first and second drive slots to interlock said first and second coupling elements for positive transmission of drive power.

11. The kit according to claim 9 wherein said engagement means includes:
a coupling lever having inner and outer ends and an intermediate portion pivotally mounted on said first power transmission means;
a universal joint connecting said engagement means to said inner end of said coupling lever; and
a lost motion means connecting said outer end of said coupling link with said actuator means.

12. A kit according to claim 13 wherein:
said actuator means includes a reciprocating element having a stop member thereon; and said lost motion means includes a biasing means, said outer end of said coupling lever mounted on said reciprocating element between said biasing means and said stop means so that said biasing means normally biases said engagement means to said drive position.

13. A bicycle having a drive mechanism selectably engageable to drive either one or both wheels thereof comprising:
a frame having a normally non-driven wheel and a drive wheel rotatably mounted thereon, a driven element mounted for rotation in response to driving rotation of said drive wheel, and a prime mover means connected to rotate said drive wheel;
a power take off means connectable for positive transmission of drive power from said driven element to said normally non-driven wheel, said power take off means including a first power transmission means mounted on said frame for selective movement into either a drive position in positive interlocked power transmitting engagement with said driven element or to a disengaged position remote from said driven element, a second power transmission means mounted on said frame in positive drive power transmitting engagement with said normally non-driven wheel, a power transfer means including a rotary flexible drive shaft having power input and output ends thereon, said power transfer means mounted on said frame to receive power from said first power transmission means and transmit power to said second power transmission means;

said power take off means having a coupling means including a support means pivotally mounted on said frame for movement toward and away from said driven element, spaced drive and idler sprockets rotatably mounted on said support means with said drive sprocket connected to drive said power transfer means, and a first endless chain trained about said drive and idler sprockets, said coupling means selectably actuable to move said first power transmission means either to said interlocated drive position causing said power take off means to connect said driven element in positive drive power transmitting relation with said normally non-driven wheel or to said disengaged position wherein driving power is not transmitted to said normally non-driven wheel; and an actuator means for selectively pivoting said support means either to said drive position wherein said first endless chain is placed in interlocked driven engagement with said driven element or to said disengaged position wherein said first endless chain is removed from driven engagement with said driven element.

14. The bicycle according to claim 13 wherein said power take off means comprises:
   a first power transmission means mounted on said frame having a drive sprocket and a first endless chain trained about said driven element and said drive sprocket;
   a second power transmission means mounted on said frame in positive drive power transmitting engagement with said normally non-driven wheel; and
   a power transfer means having power input and power output ends, said power output end connected to said second power transmission means and said power input end selectably connectable by said coupling means either in said drive position in positive drive power receiving relation with said drive sprocket or in said disengaged position.

15. In combination with a bicycle including at least one originally non-driven wheel, the improvement comprising
   a power transmission mechanism for imparting driving power to said at least one originally non-driven wheel comprising:
      a free wheel mechanism associated with said at least one originally non-driven wheel having an axle means and a driven sprocket rotatably mounted thereon;
      a support bracket means mounted on said axle means adjacent said driven sprocket;
      a driven gear means and a driving sprocket mounted for rotation on said support bracket means with said driving sprocket in spaced relation to said driven sprocket;
      an endless power transmitting chain trained about said driving and driven sprockets; and
      a driving gear means rotatably mounted on said support bracket means in driving relation with said driven gear means.

16. A power transmission mechanism according to claim 15 wherein said driven gear means and driving sprocket are coaxially mounted on said support means for simultaneous rotation and said driving gear means includes a pinion gear in constant mesh with said driven gear means.

17. A replacement hub mechanism for converting an originally non-driven wheel of a bicycle to a driven wheel, comprising:
   a free wheel mechanism having an axle and a driven sprocket;
   a driven gear and a driving sprocket mounted for rotation on said support bracket with said driving sprocket in spaced relation to said driven sprocket;
   an endless power transmitting chain trained about said driving and driven sprockets; and
   a driving gear rotatably mounted on said support bracket in driving relation with said driven gear.

* * * * *

UNITED STATES PATENT AND TRADEMARK OFFICE
CERTIFICATE OF CORRECTION

PATENT NO. : 5,332,244
DATED : July 26, 1994
INVENTOR(S) : Patrick E. Turner and Lawrence K. O'Dell It is certified that error appears in the above-identified patent and that said Letters Patent is hereby corrected as shown below:

In Claim 17, Column 14, after line 39 of the Patent, the following wording should be added --a support bracket on said axle adjacent said driven sprocket--.

Column 14, line 39, after "sprocket," insert --rotatably mounted theron--.

Signed and Sealed this

Eleventh Day of October, 1994

BRUCE LEHMAN

Attest:

Attesting Officer

Commissioner of Patents and Trademarks